United States Patent
Jia et al.

(10) Patent No.: US 11,967,057 B2
(45) Date of Patent: Apr. 23, 2024

(54) AUTONOMOUS SHIP BOTTOM INSPECTION METHOD BY ROV BASED ON 3D MODEL OF SHIP IN STL FORMAT

(71) Applicants: Guangdong Ocean University, Zhanjiang (CN); Dalian Maritime University, Dalian (CN)

(72) Inventors: Baozhu Jia, Zhanjiang (CN); Kunyang Zhang, Zhanjiang (CN)

(73) Assignees: Guangdong Ocean University, Zhanjiang (CN); Dalian Maritime University, Dalian (CN)

( * ) Notice: Subject to any disclaimer, the term of this patent is extended or adjusted under 35 U.S.C. 154(b) by 343 days.

(21) Appl. No.: 17/477,962

(22) Filed: Sep. 17, 2021

(65) Prior Publication Data
US 2022/0343484 A1    Oct. 27, 2022

Related U.S. Application Data

(63) Continuation of application No. PCT/CN2021/089289, filed on Apr. 23, 2021.

(51) Int. Cl.
| | |
|---|---|
| *G06T 7/00* | (2017.01) |
| *B63G 8/00* | (2006.01) |
| *G06T 5/70* | (2024.01) |
| *G06T 17/20* | (2006.01) |

(52) U.S. Cl.
CPC ............ *G06T 7/0002* (2013.01); *B63G 8/001* (2013.01); *G06T 5/70* (2024.01); *G06T 17/20* (2013.01); *B63G 2008/004* (2013.01); *G06T 2207/10028* (2013.01); *G06T 2207/30252* (2013.01)

(58) Field of Classification Search
CPC ....... G01S 15/8993; G01S 17/88; G01S 15/88; G01S 15/89; B64U 2101/00;
(Continued)

(56) References Cited

U.S. PATENT DOCUMENTS

| | | | | |
|---|---|---|---|---|
| 6,317,387 B1 * | 11/2001 | D'Amaddio | ........... | G01N 29/11 367/129 |
| 10,250,337 B1 * | 4/2019 | Tobias | ................... | H04N 23/51 |

(Continued)

OTHER PUBLICATIONS

B. Englot and F. Hover, "Inspection planning for sensor coverage of 3D marine structures," 2010 IEEE/RSJ International Conference on Intelligent Robots and Systems, Taipei, Taiwan, 2010, pp. 4412-4417, doi: 10.1109/IROS.2010.5648908. (Year: 2010).*

(Continued)

*Primary Examiner* — Kathleen Y Dulaney
(74) *Attorney, Agent, or Firm* — Rachel Pilloff; Sean Passino; Pilloff Passino & Cosenza LLP

(57) ABSTRACT

An autonomous ship bottom inspection method by a ROV(s) based on a ship 3D model in STL format is provided. The ship 3D model is obtained and a surface thereof is spliced by triangular facets. Body 3D coordinate points of the ship 3D model are obtained and then expanded according to a safety distance of ROV and ship to obtain inspection track points of the ROV. The ship 3D model is divided into regions, and the inspection track points in each region are performed with interpolation and smoothing. Smoothed inspection track points of the regions are connected as per a result of the dividing to obtain a ship bottom inspection track, a real-time position of the ROV is obtained, a ship bottom inspection path is generated based on the ship bottom inspection track and the real-time position. The ROV is controlled to move as per the ship bottom inspection path.

7 Claims, 4 Drawing Sheets

Obtaining a 3D model of a ship in STL format, a surface of the 3D model of the ship being spliced by a plurality of triangular facets Obtaining body 3D coordinate points of the 3D model of the ship Expanding the body 3D coordinate points according to a safety distance between the ROV and the ship, to obtain inspection track points of the ROV Dividing the 3D model of the ship into regions, and performing interpolation and smoothing on the inspection track points in each of the regions Connecting the inspection track points after the smoothing as per a result of the dividing to obtain a ship bottom inspection track, obtaining a real-time position of the ROV, generating a ship bottom inspection path based on the ship bottom inspection track and the real-time position of the ROV, and controlling the ROV to move as per the ship bottom inspection path to complete a ship bottom inspection task

(58) Field of Classification Search
CPC ............ G06T 7/0002; G06T 7/70; G06T 2207/30252; G06T 5/002; G06T 17/20; G06T 2207/10028; B63G 8/001; B63G 2008/004; B63B 79/30; B63B 59/08; B63B 71/00; B63C 11/52
USPC ............ 382/154, 141; 367/131; 114/222
See application file for complete search history.

(56) References Cited

U.S. PATENT DOCUMENTS

| | | | |
|---|---|---|---|
| 2006/0008137 A1* | 1/2006 | Nagahdaripour | G06T 7/74 382/154 |
| 2018/0099733 A1* | 4/2018 | Sato | H04B 11/00 |
| 2020/0400635 A1* | 12/2020 | Potyrailo | G05D 1/0011 |
| 2021/0287556 A1* | 9/2021 | Hong | B64C 39/024 |
| 2022/0212764 A1* | 7/2022 | Freyer | B63B 1/26 |

OTHER PUBLICATIONS

A. Kim and R. Eustice, "Pose-graph visual SLAM with geometric model selection for autonomous underwater ship hull inspection," 2009 IEEE/RSJ International Conference on Intelligent Robots and Systems, St. Louis, MO, USA, 2009, pp. 1559-1565, doi: 10.1109/IROS.2009.5354132. (Year: 2009).*

Hover et al, "Advanced perception, navigation andplanning for autonomous in-water shiphull inspection" 2009 The international Journal of Robotics Research, pp. 1-20. (Year: 2009).*

\* cited by examiner

```
┌─────────────────────────────────────────────────────────────┐
│ Obtaining a 3D model of a ship in STL format, a surface of the 3D │
│ model of the ship being spliced by a plurality of triangular facets │
└─────────────────────────────────────────────────────────────┘
                              ⇩
┌─────────────────────────────────────────────────────────────┐
│ Obtaining body 3D coordinate points of the 3D model of the ship │
└─────────────────────────────────────────────────────────────┘
                              ⇩
┌─────────────────────────────────────────────────────────────┐
│ Expanding the body 3D coordinate points according to a safety │
│ distance between the ROV and the ship, to obtain inspection track │
│ points of the ROV                                            │
└─────────────────────────────────────────────────────────────┘
                              ⇩
┌─────────────────────────────────────────────────────────────┐
│ Dividing the 3D model of the ship into regions, and performing │
│ interpolation and smoothing on the inspection track points in each of │
│ the regions                                                  │
└─────────────────────────────────────────────────────────────┘
                              ⇩
┌─────────────────────────────────────────────────────────────┐
│ Connecting the inspection track points after the smoothing as per a │
│ result of the dividing to obtain a ship bottom inspection track, │
│ obtaining a real-time position of the ROV, generating a ship bottom │
│ inspection path based on the ship bottom inspection track and the │
│ real-time position of the ROV, and controlling the ROV to move as │
│ per the ship bottom inspection path to complete a ship bottom │
│ inspection task                                              │
└─────────────────────────────────────────────────────────────┘
```

FIG. 1

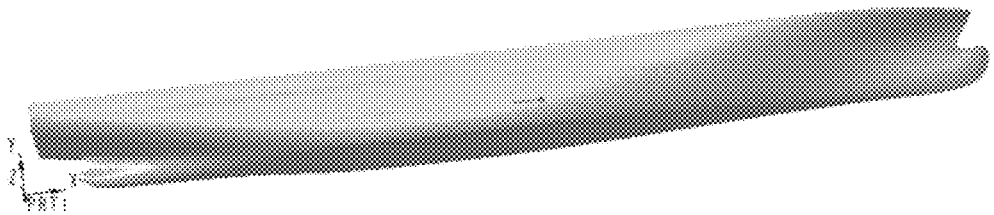

FIG. 2A

AUTONOMOUS SHIP BOTTOM INSPECTION METHOD BY ROV BASED ON 3D MODEL OF SHIP IN STL FORMAT

TECHNICAL FIELD

The invention relates to the field of ship bottom inspections, and more particularly to an autonomous ship bottom inspection method by a remotely operated vehicle(s) (ROV(s)) based on a three-dimensional (3D) model of a ship in stereo-lithography (STL) format.

DESCRIPTION OF RELATED ART

With the development of society, market demands for the development of marine resources are increasing day by day. Ships act as the most direct link between human beings and the ocean, and in recent years, a number of large and small marine vessels have also increased sharply. Scratches, damage, attachments, etc. on the bottom of the ship have greatly affected the life and navigation safety of ship. The impact of marine fouling organisms (such as diatoms, barnacles, oysters, mussels, etc.) on the ship is fatal every minute. The longer the ship performs tasks at sea, the more marine fouling organisms attach to the bottom of the ship. If a shallow water layer of some sea areas is rich in organisms, marine fouling organisms will become more serious. The marine fouling organisms attached to the bottom of the ship would greatly increase the weight of the ship and make the ship bottom uneven, and direct results are that a navigation resistance of the ship is greatly increased, a navigation speed is sharply reduced, an effective load of the ship is reduced, and fuel consumption and corresponding pollution emissions are greatly increased. Moreover, when marine organisms parasitize the bottom of the ship, they would secrete biologically active substances with strong acidity, which have a corrosive effect on the ship hull, make it rust, and accelerate the aging of the ship hull. This leads to an increase in the ship's docking maintenance cycle and the cost of cleaning up the bottom of the ship. An effective sailing/navigation time of the ship would be greatly shortened and the service life is reduced, and these effects need to be solved by a large amount of expenses. In addition, attached marine organisms will also pose a certain threat to the safe navigation of the ship. For example, resulting from the blockage of marine organisms, it is not uncommon to cause functional problems or even malfunction of important parts of ships. According to foreign statistical analysis, marine biological fouling increases the consumption of ships worldwide by more than 40% every year, and the economic loss is as high as 7.5 billion U.S. dollars.

Therefore, it is particularly important to conduct a real-time inspection on the bottom of the ship. At present, traditional ship bottom inspection methods usually include two kinds. The first kind of method is manual diving inspection, which is very expensive. For example, a common ship with a length of 20 meters and a width of 10 meters, the cost of a single artificial diving inspection is as high as RMB 12,000. The annual inspection and maintenance requires a large budget. In semi-enclosed unstable waters or waters with high drafts, it would bring great potential safety threats to diving inspectors. The second kind of method is ROV (remotely operated vehicle) type inspection, and usually the ROV is manually remotely controlled to realize the ship bottom inspection. It relies on the experience of the operator and is highly dangerous, and moreover it is difficult to achieve fast and accurate inspections of objects such as scratches, damages and attachments on the ship bottom.

Accordingly, there is an urgent need for a low-cost, high-precision ship inspection method.

SUMMARY

An objective of the invention is to provide a ROV type autonomous inspection method for a ship bottom based on a ship 3D model in STL format, so as to solve the technical problem in the related art, thereby effectively improving inspection accuracy and efficiency of ship inspection, and greatly reducing the inspection cost.

In order to achieve the above objective, the invention proposes solutions as follows. Specifically, an embodiment of the invention provides an autonomous ship bottom inspection method by a ROV based on a 3D model of a ship in STL format, including following steps of:

obtaining the 3D model of the ship in the STL format, a surface of the 3D model of the ship being spliced by multiple (i.e., more than one) triangular facets;

obtaining body 3D coordinate points of the 3D model of the ship;

expanding the body 3D coordinate points according to a safety distance between the ROV and the ship, to obtain inspection track points of the ROV;

dividing the 3D model of the ship into regions, and performing interpolation and smoothing on the inspection track points in each of the regions; and connecting the inspection track points after the smoothing as per a result of the dividing to obtain a ship bottom inspection track, obtaining a real-time position of the ROV, generating a ship bottom inspection path based on the ship bottom inspection track and the real-time position of the ROV, and controlling the ROV to move as per the ship bottom inspection path to complete a ship bottom inspection task.

In a preferred embodiment, a method for obtaining the body 3D coordinate points of the 3D model of the ship includes:

dividing a ship bottom of the ship into multiple planes, and obtaining intersection points of the planes with each of the triangular facets, the intersection points being the body 3D coordinate points of the 3D model of the ship.

In a preferred embodiment, a method for obtaining the inspection track points of the ROV includes:

projecting normal vectors corresponding to the body 3D coordinate points obtained from the same one of the planes into a plane, and then performing unitization processing on the normal vectors to obtain unitization processed normal vectors; and expanding the body 3D coordinate points outwards as per directions of the unitization processed normal vectors to obtain the inspection track points of the ROV, an outwards expanded distance being the safety distance between the ROV and the ship.

In a preferred embodiment, the inspection track points are performed with the interpolation processing by using a piece-wise linear interpolation method.

In a preferred embodiment, the inspection track points after being performed with the interpolation processing are performed with the smoothing by using a cubic spline interpolation method.

In a preferred embodiment, a method for obtaining the ship bottom inspection path includes:
  connecting the inspection track points in each of the regions, to obtain inspection tracks of the respective regions; and
  connecting the inspection tracks of the respective regions in a head-to-tail manner as per a preset inspection sequence to obtain a ship bottom inspection track, obtaining the real-time position of the ROV, and generating the ship bottom inspection path based on the ship bottom inspection track and the real-time position of the ROV, the ship bottom inspection path being used to control the ROV to move to complete the ship bottom inspection task.

In another preferred embodiment, wherein a method for obtaining the ship bottom inspection path includes:
  connecting the inspection track points in each of the regions, to obtain inspection tracks of the respective regions; and
  obtaining real-time positions of multiple the ROVs respectively, and generating ship bottom inspection paths of the respective regions based on the inspection tracks of the respective regions and the real-time positions of the multiple ROVs, the ship bottom inspection paths for the respective regions being used to respectively control the multiple ROVs to move to complete the ship bottom inspection task, and the number of the plurality of ROVs being less than or equal to the number of the regions.

The invention can achieve the following beneficial effects that:

In one aspect, the embodiment of the invention automatically obtains the ship bottom inspection track of the ROV, automatically generates the ship bottom inspection path based on the ship bottom inspection track and the real-time position of the ROV, and makes the ROV move as per the inspection path by a control algorithm during an inspection process to realize a real-time inspection of the ship bottom, it does not require manual diving inspection and manual remote control operation, thereby greatly reducing the inspection cost and avoiding safety threats to diving inspectors in high-draft waters.

In another aspect, the embodiment of the invention obtains the inspection track points of the ROV(s) through the ship 3D model in STL format, and fully considers the safety distance between the ROV and the ship during the acquisition process of the inspection track points, which can effectively prevent the ROV from colliding with the ship hull to damage the ROV and change the running track of the ROV. Meanwhile, before expanding the body 3D coordinate points into the inspection track points, the embodiment of the invention projects the normal vectors corresponding to the body 3D coordinate points obtained from the same plane into a plane and then performs unitization processing on the normal vectors, which can effective avoid drifts of the inspection track points and ensure the accuracy of the inspection track.

In still another aspect, the embodiment of the invention divides the 3D model of the ship into regions, uses the piece-wise linear interpolation method to perform interpolation processing on the inspection track points, and uses the cubic spline interpolation method to smooth the inspection track points after the interpolation processing, which can effectively avoid the occurrence of non-smoothness of the inspection track, and has strong convergence in each segmented unit interval and good numerical stability. The interpolation points can be adjusted according to the inspection accuracy requirements of each region. Under the premise of ensuring the inspection accuracy, it can effectively improve the inspection speed.

In even still another aspect, the embodiment of the invention can use the same ROV to carry out inspections in various regions of the ship according to the preset direction, and can also use different ROVs in different regions for simultaneous inspections instead, which can effectively improve the inspection speed and has strong inspection flexibility.

BRIEF DESCRIPTION OF DRAWINGS

In order to explain embodiments of the invention or technical solutions in the related art more clearly, drawings used in the embodiments will be briefly introduced below. Apparently, the drawings in the following description are only some of embodiments of invention. For those skilled in the art, other drawings can be obtained from these drawings without paying any creative effort.

FIG. 1 is a schematic flowchart of an autonomous ship bottom inspection method by a ROV(s) based on a 3D model of a ship in STL format according to an embodiment of the invention.

FIGS. 2A-2C are schematic views of a ship hull model (a container ship is taken as an example) according to an embodiment of the invention, where FIG. 2A is a schematic front view of the ship hull model, FIG. 2B is a schematic bottom view of the ship hull model, and FIG. 2C is a schematic left view of the ship hull model (as observed from ship stern).

FIG. 3A is a schematic overall view of the 3D model of the ship in STL format, and FIG. 3B is a schematic detailed view of the 3D model of the ship in STL format.

DETAILED DESCRIPTION OF EMBODIMENTS

Technical solutions in the embodiments of the invention will be clearly and completely described below in conjunction with the accompanying drawings in the embodiments of the invention. Apparently, the described embodiments are only a part of embodiments of the invention, rather than all of embodiments of the invention. Based on the described embodiments of the invention, all other embodiments obtained by those skilled in the art without creative effect shall fall within the protection scope of the invention.

In order to make the above objectives, features and advantages of the invention more clear and understandable, the invention will be further described in detail below with reference to the accompanying drawings and specific embodiments.

Referring to FIG. 1, an embodiment of the invention provides an autonomous ship bottom inspection method by a ROV based on a 3D model of a ship (hereinafter also referred to ship 3D model) in STL format, including the following steps of S1-S6.

In the step S1, a ship 3D model in STL (stereo-lithography) format is obtained, and a surface of the ship 3D model is spliced by several triangular facets.

Figure 2B:
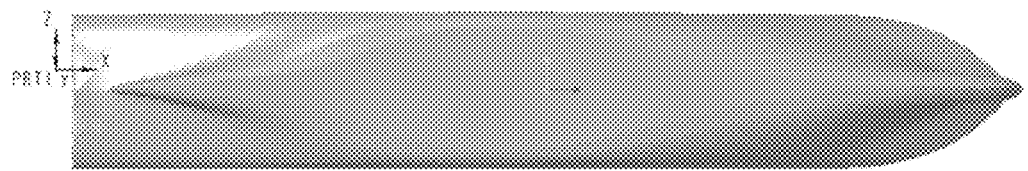
Figure 2C:
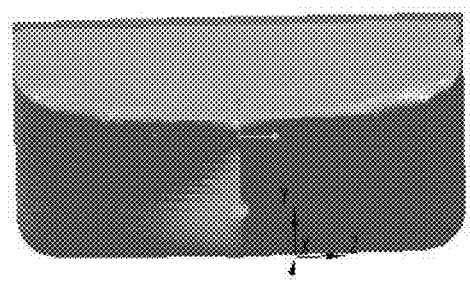
Figure 3A:
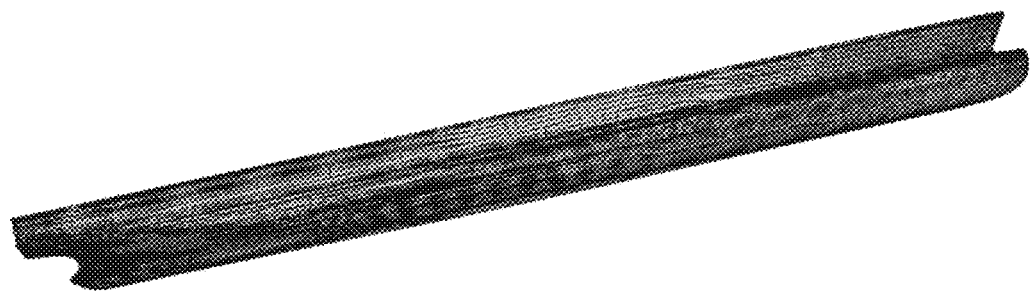
FIGS. 3A-3B are schematic views of a 3D model of a ship in STL format according to an embodiment of the invention, where
Figure 3B:
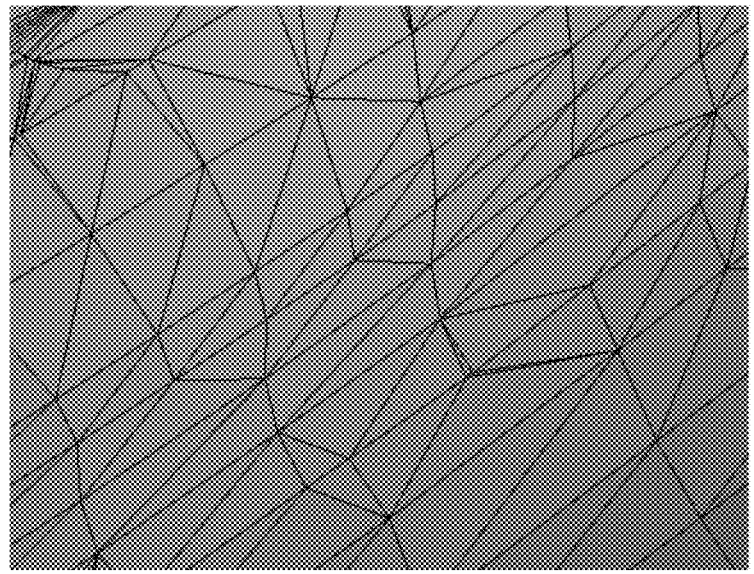

Specifically, a STL file is a file format used to represent triangular meshes in computer graphics application systems, and is the most standard file type used by rapid prototyping systems. There are two types of STL files: one is in ASCII plain-text format, and the other is in binary format. In the illustrated embodiment the ship 3D model uses the ASCII plain-text format, and the STL file in the ASCII plain-text format gives geometric information of the triangular facets line by line, and each line starts with 1 or 2 keywords. An information unit (facet) of the triangular facets in the STL file is a triangular facet with vector direction. The first line of the entire STL file gives a file path and a file name. In an STL file, each facet consists of 7 lines of data, facetnormal represents normal vector coordinates of a triangular facet pointing to outside of entity, the 3 lines of data immediately after outerloop respectively represent coordinates of 3 vertices of the triangular facet, and the 3 vertices are arranged counterclockwise along a normal vector direction pointing to outside of entity. The illustrated embodiment takes a container ship as an example, the ship hull model is shown in FIGS. 2A-2C, and a ship 3D model in STL format converted from the ship hull model is shown in FIGS. 3A-3B.

In the step S2, body 3D coordinate points of the ship 3D model are obtained.

In particular, the ship bottom is divided into several planes along lengthwise direction of the ship, and then intersection points of the planes with each the triangular facet are obtained. Herein, the intersection points are the body 3D coordinate points of the ship 3D model.

Figure 4:
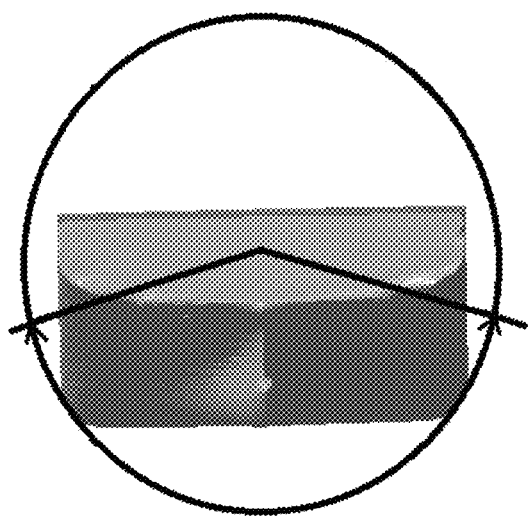
FIG. 4 is a schematic equivalent diagram of a ship bottom according to an embodiment of the invention, in which the arrowed arc indicates an area to be inspected of the ship bottom.
Figure 5:
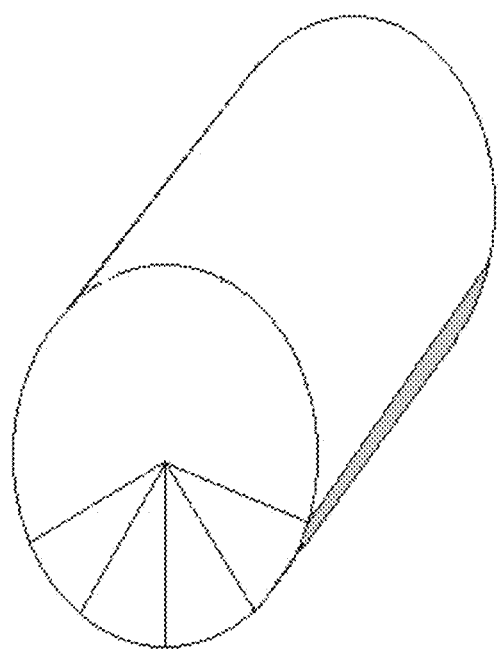
FIG. 5 is a schematic view of dividing a ship bottom into several planes according to an embodiment of the invention.

In the illustrated embodiment, in order to facilitate the automatic generation of the trajectory/track and reduce the amount of calculation, the ship hull is approximated as a cylindrical shape, as shown in FIG. 4. In FIG. 4, the part indicated by an arrowed arc represents the ship bottom. The cylindrical surface of the ship bottom is evenly divided to obtain several approximate planes passing through an axis of the cylinder, as shown in FIG. 5. Herein, by dividing the ship bottom into several planes, it is convenient to determine the tracks of ROV inspection.

In the step S3, the body 3D coordinate points are expanded according to a safety distance between the ROV and the ship, to obtain inspection track points of the ROV.

Specifically, when the ROV performs a ship bottom inspection task, in order to prevent the ROV from colliding with the ship hull, the safety distance between the ROV and the ship is set to be 1 meter in the illustrated embodiment. The body 3D coordinate points are expanded outwards as per their corresponding normal vectors to obtain the inspection track points of the ROV, Herein, the outwards expanded distance is the safety distance between the ROV and the ship.

In addition, based on different sizes and directions of the triangular facets in the STL file, when the body 3D coordinate points are extended outwards by the safety distance along their respective normal vectors, the obtained inspection track points would drift, which would bring difficulties to the smoothing of track points and the control of the ROV in the later stage. In order to solve this problem, in the illustrated embodiment, before expanding the body 3D coordinate points, the normal vectors corresponding to the body 3D coordinate points obtained from the same plane are projected into a plane and then are performed with unitization processing, which can effectively avoid the drifts of the inspection track points obtained by the expanding.

In the step S4, the ship 3D model is divided into several regions, and interpolation processing is performed on the inspection track points in each of the regions.

In the illustrated embodiment, the ship 3D model is divided into three regions, i.e., ship bow, amidship and ship stern; and the inspection track points then are processed by regions.

More specifically, a piece-wise linear interpolation method is used to perform the interpolation processing on the inspection track points of the ROV, which has strong convergence in each segmented unit interval, good numerical stability, and easy implementation. The piece-wise linear interpolation method can improve the interpolation accuracy by adding interpolation points. During the interpolation processing, the interpolation points can be adjusted according to the inspection accuracy requirements of respective regions, and thus the inspection speed can be effectively improved on the premise of ensuring the inspection accuracy.

In the step S5, the inspection track points after the interpolation processing are performed with smoothing processing.

In the illustrated embodiment, a cubic spline interpolation method is used to perform smoothing processing on the inspection track points after the interpolation processing. Since the piece-wise linear interpolation cannot guarantee continuity of derivative of an interpolation function at a node, i.e., it is not smooth. Therefore, the defect of piece-wise linear interpolation that is not smooth at the node can be effectively compensated by the cubic spline interpolation method.

In the step S6, the inspection track points after the smoothing processing are connected as per the result of the dividing of regions in the step S4 to obtain a ship bottom inspection track, a real-time position of the ROV is obtained, a ship bottom inspection path is generated based on the ship bottom inspection track and the real-time position of the ROV, and the ROV then is controlled to move as per the ship bottom inspection path to thereby complete a ship bottom inspection task.

Figure 6:
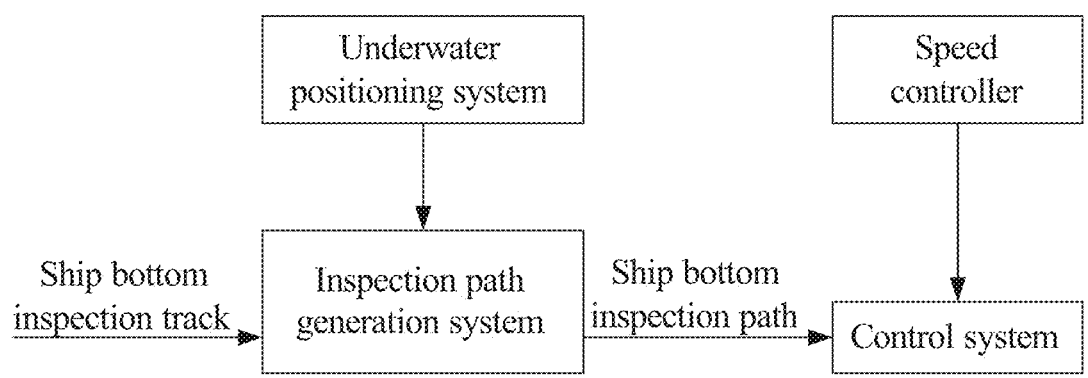
FIG. 6 is a schematic block diagram of an autonomous inspection track tracking controller of a ROV according to an embodiment of the invention.

In an illustrated embodiment, the ROV includes an autonomous inspection track tracking controller. The autonomous inspection track tracking controller as shown in FIG. 6 includes: an underwater positioning system, a speed controller, an inspection path generation system, and a control system. The underwater positioning system is configured (i.e., structured and arranged) to collect the position of the ROV in real time (i.e., collect the real-time position of the ROV), and the inspection path generation system is configured to generate the ship bottom inspection path according to the real-time position of the ROV and the ship bottom inspection track. The control system is configured to control the ROV to perform an inspection as per the ship bottom inspection path by using a preset control algorithm. The control algorithm may include one of PID (proportion integration differentiation) control, back-stepping control and sliding-mode control. The speed controller is configured to control a movement speed of the ROV.

Example 1

A specific method for obtaining the ship bottom inspection path may include:
connecting the inspection track points in each of the regions, to obtain an inspection track of each of the regions; and connecting the inspection tracks of the respective regions in a head-to-tail manner as per a preset inspection order/sequence to obtain a ship bottom inspection track, obtaining a real-time position of the ROV, generating a ship bottom inspection path based on the ship bottom inspection track and the real-time position of the ROV. After that, the ROV can be controlled to move according to the ship bottom inspection path to complete a ship bottom inspection task. In this example, The ROV carries out the ship bottom inspection in the order of ship bow, amidship and ship stern, which can effectively improve the accuracy of ship bottom inspection.

Example 2

A specific method for obtaining the ship bottom inspection path may include:
connecting the inspection track points in each of the regions, to obtain an inspection track of each of the regions; and
obtaining real-time positions of three ROVs, and generating ship bottom inspection paths of the respective regions based on the inspection tracks of the respective regions and the real-time positions of the three ROVs. After that, the three ROVs can be controlled to perform inspections on the ship bow, the amidship and the ship stern respectively as per the ship bottom inspection paths of the respective regions, thereby effectively improving the ship bottom inspection speed.

Besides, according to actual inspection needs, one or more regions can be inspected through one ROV to increase the ship bottom inspection speed.

The above-mentioned embodiments or examples only describe preferred implementations of the invention, rather than limit the scope of the invention. Without departing from the design spirit of the invention, various modifications and changes to the technical solution of the invention can be made by those skilled in the art, which shall fall within the scope of protection determined by the appended claims of the invention.

What is claimed is:

1. An autonomous ship bottom inspection method by a remotely operated vehicle (ROV) based on a three-dimensional (3D) model of a ship in stereo-lithograph (STL) format, comprising:
obtaining the 3D model of the ship in the STL format, wherein a surface of the 3D model of the ship is spliced by a plurality of triangular facets;
obtaining body 3D coordinate points of the 3D model of the ship;
expanding the body 3D coordinate points according to a safety distance between the ROV and the ship, to obtain inspection track points of the ROV;
dividing the 3D model of the ship into regions, and performing interpolation and smoothing on the inspection track points in each of the regions to obtain smoothed inspection track points of each of the regions; and
connecting the smoothed inspection track points of each of the regions as per a result of the dividing to obtain a ship bottom inspection track, obtaining a real-time position of the ROV, generating a ship bottom inspection path based on the ship bottom inspection track and the real-time position of the ROV, and controlling the ROV to move as per the ship bottom inspection path to complete a ship bottom inspection task.

2. The autonomous ship bottom inspection method as claimed in claim 1, wherein a method for obtaining the body 3D coordinate points of the 3D model of the ship comprises:
dividing a ship bottom of the ship into a plurality of planes, and obtaining intersection points of the plurality of planes with each of the plurality of triangular facets, wherein the intersection points are the body 3D coordinate points of the 3D model of the ship.

3. The autonomous ship bottom inspection method as claimed in claim 2, wherein a method for obtaining the inspection track points of the ROV comprises:
projecting normal vectors corresponding to the body 3D coordinate points obtained from the plurality of planes into a plane, and then performing unitization processing on the normal vectors to obtain unitization processed normal vectors;
expanding the body 3D coordinate points outwards as per directions of the unitization processed normal vectors to obtain the inspection track points of the ROV, wherein an outwards expanded distance is the safety distance between the ROV and the ship.

4. The autonomous ship bottom inspection method as claimed in claim 1, wherein the inspection track points are performed with the interpolation by using a piece-wise linear interpolation method.

5. The autonomous ship bottom inspection method as claimed in claim 1, wherein the inspection track points after being performed with the interpolation are performed with the smoothing by using a cubic spline interpolation method.

6. The autonomous ship bottom inspection method as claimed in claim 1, wherein a method for obtaining the ship bottom inspection path comprises:
connecting the inspection track points in each of the regions, to obtain inspection tracks of the respective regions; and
connecting the inspection tracks of the respective regions in a head-to-tail manner as per a preset inspection sequence to obtain a ship bottom inspection track, obtaining the real-time position of the ROV, and generating the ship bottom inspection path based on the ship bottom inspection track and the real-time position of the ROV, wherein the ship bottom inspection path is used to control the ROV to move to complete the ship bottom inspection task.

7. The autonomous ship bottom inspection method as claimed in claim 1, wherein a method for obtaining the ship bottom inspection path comprises:
connecting the inspection track points in each of the regions, to obtain inspection tracks of the respective regions; and
obtaining real-time positions of a plurality of ROVs respectively, and generating ship bottom inspection paths of the respective regions based on the inspection tracks of the respective regions and the real-time positions of the plurality of ROVs, wherein the ship bottom inspection paths for the respective regions are used to respectively control the plurality of ROVs to move to complete the ship bottom inspection task, and the number of the plurality of ROVs is less than or equal to the number of the regions.

* * * * *